United States Patent
Nagaoka et al.

(10) Patent No.: US 10,394,218 B2
(45) Date of Patent: Aug. 27, 2019

(54) VIBRATION CUTTING PROCESS DIAGNOSTIC DEVICE

(71) Applicant: Mitsubishi Electric Corporation, Chiyoda-ku, Tokyo (JP)

(72) Inventors: Kotaro Nagaoka, Tokyo (JP); Akira Tanabe, Tokyo (JP); Toshihiro Azuma, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 138 days.

(21) Appl. No.: 15/512,725

(22) PCT Filed: Oct. 17, 2014

(86) PCT No.: PCT/JP2014/077748
§ 371 (c)(1),
(2) Date: Mar. 20, 2017

(87) PCT Pub. No.: WO2016/059729
PCT Pub. Date: Apr. 21, 2016

(65) Prior Publication Data
US 2017/0300034 A1    Oct. 19, 2017

(51) Int. Cl.
*G05B 19/4065* (2006.01)
*G05B 19/406* (2006.01)
(Continued)

(52) U.S. Cl.
CPC ....... *G05B 19/4065* (2013.01); *B23Q 15/013* (2013.01); *B23Q 15/08* (2013.01);
(Continued)

(58) Field of Classification Search
None
See application file for complete search history.

(56) References Cited

U.S. PATENT DOCUMENTS 5,054,340 A * 10/1991 Sugita .................. B23Q 1/601
82/118
5,085,109 A    2/1992 Hidehiko et al.
(Continued)

FOREIGN PATENT DOCUMENTS

CN    102870055 A    1/2013
JP    1-271102 A    10/1989
(Continued)

OTHER PUBLICATIONS

Japanese Office Action for JP 2015-537475 dated Nov. 17, 2015.
(Continued)

*Primary Examiner* — Carlos R Ortiz Rodriguez
(74) *Attorney, Agent, or Firm* — Sughrue Mion, PLLC; Richard C. Turner

(57) ABSTRACT

A vibration cutting process diagnostic device diagnoses the propriety of a vibration cutting process to machine the sectional shape of a working object into a non-complete round shape by reciprocating a movable shaft. This device includes a frequency analyzer to calculate a frequency component contained in a position command signal for the movable shaft on the basis of shape data, which is machining shape data on a workpiece treated as the working object, and a machining speed set value; and a process diagnosis executor to diagnose the propriety of machining the shape data under the machining speed set value on the basis of the frequency component and a movable shaft parameter of the movable shaft.

4 Claims, 3 Drawing Sheets

(51) Int. Cl.
   *B23Q 15/013* (2006.01)
   *B23Q 15/08* (2006.01)
   *B23B 5/36* (2006.01)
(52) U.S. Cl.
   CPC .............. *G05B 19/406* (2013.01); *B23B 5/36* (2013.01); *G05B 2219/37087* (2013.01); *G05B 2219/39241* (2013.01)

(56) References Cited

U.S. PATENT DOCUMENTS

| | | | |
|---|---|---|---|
| 5,229,951 | A | 7/1993 | Sugita et al. |
| 2013/0071198 | A1 | 3/2013 | Kiryu et al. |

FOREIGN PATENT DOCUMENTS

| | | | |
|---|---|---|---|
| JP | 2-036045 | A | 2/1990 |
| JP | 2-205439 | A | 8/1990 |
| JP | 3-178703 | A | 8/1991 |
| JP | 6-083417 | A | 3/1994 |
| JP | 2007-033244 | A | 2/2007 |
| JP | 2008-068364 | A | 3/2008 |
| JP | 2008-087146 | A | 4/2008 |
| JP | 2009-055677 | A | 3/2009 |
| JP | 2012-053509 | A | 3/2012 |

OTHER PUBLICATIONS

Taiwanese Office Action TW 10520705520 dated Jun. 6, 2016.
International Search Report of PCT/JP2014/077748, dated Jan. 20, 2015.
Communication dated Nov. 2, 2018 from the State Intellectual Property Office of the P.R.C. in counterpart Chinese application No. 201480082701.2.

* cited by examiner

VIBRATION CUTTING PROCESS DIAGNOSTIC DEVICE

CROSS REFERENCE TO RELATED APPLICATIONS

This application is a National Stage of International Application No. PCT/JP2014/077748 filed Oct. 17, 2014, the contents of all of which are incorporated herein by reference in their entirety.

FIELD

The present invention relates to a vibration cutting process diagnostic device that is used when a reciprocating tool is used during a vibration cutting process to machine the sectional shape of a working object into a non-complete round shape; and that can diagnose the propriety of the process in advance of it being performed.

BACKGROUND

In relation to machine tools for performing a cutting process, there has been proposed various machining apparatuses and machining methods to perform a process that could not be done conventionally. One of the examples is a vibration cutting process in which a tool is reciprocated for a rotation-cutting process at a high speed to form a non-complete round shape.

According to a conventional rotation-cutting process, there is used a machine that includes a main shaft for rotating a workpiece and a rectilinear shaft for moving a tool bit, which is an example of a tool, in the radial direction of the workpiece. The tool is moved to a commanded position on the rectilinear shaft and is brought into contact with the workpiece being rotated, and thereby the sectional shape of the working object is machined into a complete round shape. At this time, if, while the workpiece is rotated, the tool is moved in the radial direction by reciprocating the tool on the rectilinear shaft, the workpiece can be machined into a non-complete round shape. For example, if the tool is reciprocated twice on the rectilinear shaft toward the center of the workpiece while the workpiece is rotated once, the sectional shape of the working object can be made into an elliptical shape. Specifically, the elliptical shape is formed such that its minor axis is defined by a distance between the tip of the tool and the center of the rotary shaft obtained at the time when the tool is positioned closest to the center of the workpiece, and such that its major axis is defined by a distance between the tip of the tool and the center of the rotary shaft obtained at the time when the tool is positioned farthest from the center of the workpiece. Further, the workpiece can be machined into a more complicated shape by deliberately adjusting the reciprocating motion pattern.

Further, Patent Literature 1 discloses a vibration cutting apparatus and a vibration cutting method that can machine a working object into a non-complete round shape. According to a technique disclosed in Patent Literature 1, a machine having rectilinear shafts of two axes or more is used to machine a working object into a non-complete round shape by giving periodic motion commands with different phase and amplitude to two shafts of the rectilinear shafts.

As described above, when a working object is machined into a non-complete round shape, a rectilinear shaft makes a sine wave-like motion which may contain a harmonic component depending on the curvature of the commanded machining shape. On the other hand, a motor control unit for a machine tool requires position control with higher speed and higher accuracy. However, if the feeding speed is set higher to increase the throughput rate or if the control gain is set higher to improve the accuracy, machine natural vibration is excited and machine resonance is thereby caused. Consequently the behavior becomes vibratory and the machining accuracy is lowered.

Conventionally, in consideration of the above, a filter for treating a position command signal is used to remove the machine natural vibration. The filter used is generally called "band elimination filter" or "low-pass filter" and is set to remove a specific frequency band component with respect to the position command signal or another state quantity inside the control unit, thereby preventing excitation of the machine natural vibration.

If the machine resonance is caused by a specific frequency, a band elimination filter for attenuating a frequency band component including this frequency is operated onto the position command signal. Here, if the frequency band is narrow, a notch filter can be used in place of the band elimination filter. Further, if the machine resonance is caused by a frequency of not less than a specific value and the frequency varies depending on the mass or another condition of a workpiece, a low-pass filter for attenuating the frequency component higher than the frequency is operated onto the position command signal. When a filter for treating the position command signal in this way is used, it becomes possible to realize a process with higher speed and higher accuracy without excitations of the machine resonances. In general, a frequency component contained in the position command signal is far lower than the cutoff frequency of a band elimination filter, notch filter, or low-pass filter that are operated thereon, so that the process for a commanded shape can be performed even if the filter is operated thereon.

CITATION LIST

Patent Literature

Patent Literature 1: Japanese Patent Application Laid-open No. 2008-68364

SUMMARY

Technical Problem

However, according to the conventional technique of Patent Literature 1 described above, in the case of an application for performing a process by reciprocating a tool at a high speed, there is a phenomenon as follows: A position command signal for the rectilinear shaft for moving the tool in the radial direction includes a frequency component determined by the period of the tool reciprocating motion. As the machining shape to be commanded becomes more complicated, the position command signal comes to contain a higher harmonic wave. As the feeding speed is higher, the frequency component contained in the position command signal becomes higher. Consequently, if the frequency component contained in the position command signal is equal to the cutoff frequency band of a filter in the control unit, or if the frequency component falls within the cutoff frequency band, the machining accuracy is lowered and the working object cannot be machined into a desired shape, which is a problem.

Further, if anti-resonance is present in a mechanical system, the reaction of the mechanical system becomes slow with respect to a position command signal component near to the anti-resonance frequency. Consequently, a problem arises such that the machining accuracy is lowered.

Further, as a result of actually performing a trial process, if the machining accuracy is low, it is difficult to sort out the causes, and it becomes necessary to perform a search by try and error for the feeding speed and the main shaft revolution number, which are examples of the command conditions suitable for obtaining a desired machining accuracy. Consequently, a problem arises such that a large number of steps are required to determine the command conditions.

The present invention has been made in view of the above, and an objective of the present invention is to provide a vibration cutting process diagnostic device that can be used for a vibration cutting process to machine the sectional shape of a working object into a non-complete round shape by reciprocating a tool for a rotation-cutting process and that can diagnose the propriety of the vibration cutting process under a speed condition specified for vibration cutting in advance of the process being performed.

Solution to Problem

In order to solve the problem and achieve the objective the present invention relates to a vibration cutting process diagnostic device for diagnosing propriety of a vibration cutting process used when a movable shaft is reciprocated to machine a sectional shape of a working object into a non-complete round shape. The vibration cutting process diagnostic device includes: a frequency analyzer to calculate a frequency component contained in a position command signal for the movable shaft on a basis of machining shape data on the working object and a machining speed set value; and a process diagnosis executor to diagnose propriety of machining the machining shape data under the machining speed set value on a basis of the frequency component and a movable shaft parameter of the movable shaft.

Advantageous Effects of Invention

The vibration cutting process diagnostic device according to the present invention provides an effect capable of realizing a vibration cutting process diagnosis for machining the sectional shape of a working object into a non-complete round shape by reciprocating a tool for a rotation-cutting process and capable of diagnosing the propriety of the vibration cutting process under a speed condition specified for vibration cutting, in advance of the process being performed.

DESCRIPTION OF EMBODIMENTS

Exemplary embodiments of a vibration cutting process diagnostic device according to the present invention will be explained below in detail with reference to the accompanying drawings. The present invention is not limited to the following embodiments.

First Embodiment

Figure 1:
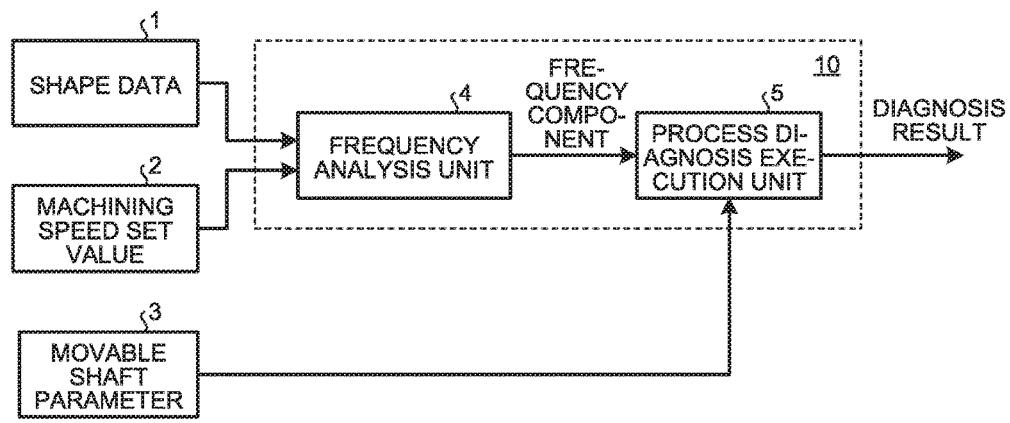
FIG. 1 is a block diagram illustrating a configuration of a vibration cutting process diagnostic device according to a first embodiment.

FIG. 1 is a block diagram illustrating a configuration of a vibration cutting process diagnostic device according to a first embodiment of the present invention. The vibration cutting process diagnostic device 10 illustrated in FIG. 1 is a device for diagnosing the propriety of a vibration cutting process used when a rectilinear shaft of a tool rest 14, which serves as a movable shaft, is reciprocated in order to machine the sectional shape of a working object into a non-complete round shape. This device includes a frequency analysis unit 4 to read working object shape data 1 and a machining speed set value 2 and then to calculate on the basis thereon a frequency component contained in a position command signal for the movable shaft; and a process diagnosis execution unit 5 to diagnose the propriety of machining the shape data 1 under the machining speed set value 2 on the basis of the frequency component calculated by the frequency analysis unit 4 and a movable shaft parameter 3 of the movable shaft. Here, the movable shaft collectively means a mechanism for moving the tool rest 14; and the rectilinear shaft means a drive shaft of the tool rest 14, which is one form of the movable shaft and serves as a drive mechanism for moving the tool rest 14 in a straight line.

Figure 2:
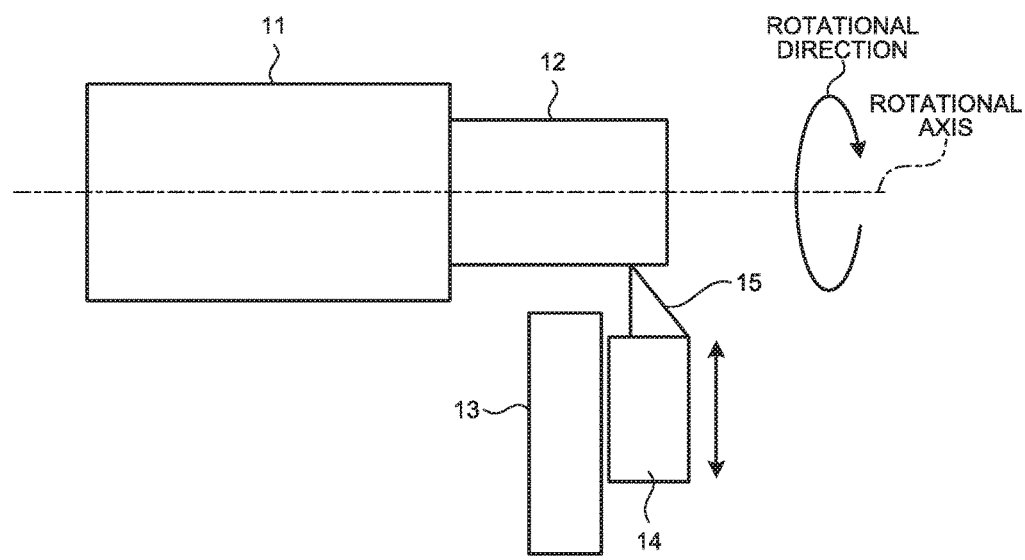
FIG. 2 is a schematic view illustrating a configuration example of the mechanical system of a lathe in the first embodiment.

FIG. 2 is a schematic view illustrating a configuration example of the mechanical system of a lathe. A workpiece 12 is attached to a rotation-cutting main shaft 11 to be rotated; and a rotation-cutting tool 15 is attached to the tool rest 14. The tool rest 14 is reciprocated in the radial direction by a tool rest drive unit 13. If the tool rest 14 is reciprocated twice while the rotation-cutting main shaft 11 is rotated once, the workpiece 12 can be machined into the shape of an elliptical column. Further, if the tool rest 14 is reciprocated a greater number of times, the sectional shape of the workpiece 12 can be machined into a more complicated shape.

When the shape data 1, which is data on the sectional shape after the process on the workpiece 12 to be machined, and the machining speed set value 2, which is the rotational speed of the rotation-cutting main shaft 11, are set, then the frequency analysis unit 4 performs polar coordinate transformation on the shape data 1, and thereby obtains a deflection angle and a radial direction displacement. Here, the radial direction is a radial direction with respect to the rotational axis of the rotation-cutting main shaft 11. In this example, the radial direction is defined by a line segment extending from the contact surface of the rotation-cutting tool 15 toward the center of the sectional shape of the workpiece 12. Time-series variations in the radial direction displacement are then obtained, in a case where an interpolation is performed by changing the deflection angle from 0° to 360° at a rotational speed set by the machining speed set value 2. Further, the frequency component of the radial direction displacement is obtained by performing Fourier transformation on the time-series variations. For example, in a case where the sectional shape after the process on the workpiece 12 to be machined is elliptical and the rotational speed command value for the rotation-cutting main shaft 11 is S revolutions per minute, the radius varies in a form like a sine wave over two periods from 0 [seconds] to 60/S [seconds]. Accordingly, the frequency component contained in the time-series variations of the radial direction displacement is a component with a period of 30/S [seconds], i.e., a frequency of S/30 [Hz].

Figure 3:
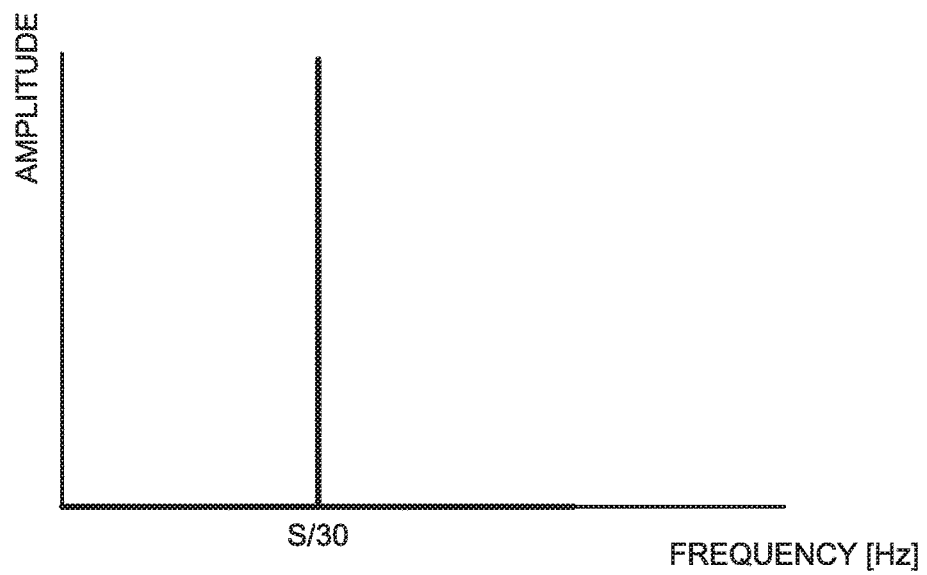
FIG. 3 is a graph illustrating a frequency analysis result obtained by a frequency analysis unit in the first embodiment.

FIG. 3 is a graph illustrating a frequency analysis result obtained by the frequency analysis unit 4 in the first embodiment. In an actual process, the deflection angle corresponds to the rotational angle of the rotation-cutting main shaft 11; and the radial direction displacement corresponds to the position of the rectilinear shaft for driving the tool rest 14. Further, in the first embodiment, the tool rest drive unit 13 is a control system for performing position feedback control, and the feedback control system is assumed to perform proportional control with a feedback control gain K. In this case, the position response characteristics of the control system of the tool rest drive unit 13 include the characteristics of a low-pass filter with a cutoff frequency of K [rad/s]. Here, when the cutoff frequency of K [rad/s] is converted into units of Hz, it comes to K/2π [Hz]. The movable shaft parameter 3 includes the feedback control gain K for the tool rest drive unit 13. In this case, the tool rest drive unit 13 cannot catch up with a command of the control system that contains a frequency component higher than the cutoff frequency of K.

The process diagnosis execution unit 5 diagnoses the propriety of the process under a condition of the machining speed specified by the machining speed set value 2, i.e., the rotational speed of the rotation-cutting main shaft 11, by using the frequency component calculated by the frequency analysis unit 4 and the feedback control gain K included in the movable shaft parameter 3. In the first embodiment, because the frequency component is S/30 [Hz], if this is smaller than the cutoff frequency of K/2π [Hz] determined from the feedback control gain K of the tool rest drive unit 13, the process can be performed. Accordingly, if the rotational speed S of the rotation-cutting main shaft 11 is not more than 15K/π revolutions per minute, the process can be performed. For example, in a case where the feedback control gain K is 314 [rad/second], if the rotational speed of the rotation-cutting main shaft 11 is not more than 1,500 revolutions per minute, the process is diagnosed to be performable; and, if the rotational speed of the rotation-cutting main shaft 11 is more than 1,500 revolutions per minute, the process is diagnosed to be unperformable. Further, the process diagnosis execution unit 5 outputs a diagnosis result that the rotational speed of the rotation-cutting main shaft 11 with which the process can be performed is not more than 1,500 revolutions per minute. The output diagnosis result is displayed by a display (not shown), for example. The display can be a display included in the vibration cutting process diagnostic device.

In the first embodiment, the mechanism by which the tool rest 14 is reciprocated in the radial direction by the tool rest drive unit 13 can be realized by a shaft member present between the tool rest drive unit 13 and the tool rest 14 such that the shaft member makes a rectilinear reciprocating motion in the radial direction. Alternatively, this mechanism can be realized by a shaft member disposed on a side of the tool rest 14 opposite to the rotation-cutting tool 15 such that the shaft member makes a rectilinear reciprocating motion in the radial direction.

In the first embodiment, the vibration cutting process diagnostic device 10 can be realized by a computer, for example. In this case, the shape data 1 and the machining speed set value 2 are input via a keyboard, which is an example of an input device, connected to the computer and are stored in storage inside the computer. The frequency analysis unit 4 and the process diagnosis execution unit 5 are realized by the CPU (Central Processing Unit) of the computer. The diagnosis result output from the process diagnosis execution unit 5 is output to a display monitor, which is an example of an output device, connected to the computer and is displayed thereby. The movable shaft parameter 3 is input from the tool rest drive unit 13 and is stored in storage inside the computer.

As described above, according to the first embodiment, the propriety of the vibration cutting process under a specified speed condition can be diagnosed in advance of the process being performed. Further, because the upper limit value defining a range of the machining speed that makes the process performable can be understood in advance of the process being performed, the machining speed can be determined without performing a trial process. Further, according to the first embodiment, when a reference-model following control or position proportional control, which is an example of a control system having a low-pass filter characteristic, is used, the propriety of the vibration cutting process can be diagnosed.

Second Embodiment

The configuration according to the second embodiment differs from the configuration according to the first embodiment in that the control system of the rectilinear shaft of the tool rest, which is a movable shaft, is a control system composed such that it uses a feed-forward control and a notch filter. The position response characteristics of the control system of the tool rest drive unit 13 are the characteristics of a band elimination filter that attenuates the gain of a frequency band specified by a parameter of the notch filter. The movable shaft parameter 3 includes the cutoff frequency band of the band elimination filter. The cutoff frequency band of the band elimination filter is assumed to be such that the lower limit is $F_{min}$ [Hz] and the upper limit is $F_{max}$ [Hz]. Further, the frequency component of a radial direction displacement in the sectional shape of a workpiece 12 to be machined is assumed to include a harmonic component twice as large as the rotational frequency of the rotation-cutting main shaft 11.

Figure 4:
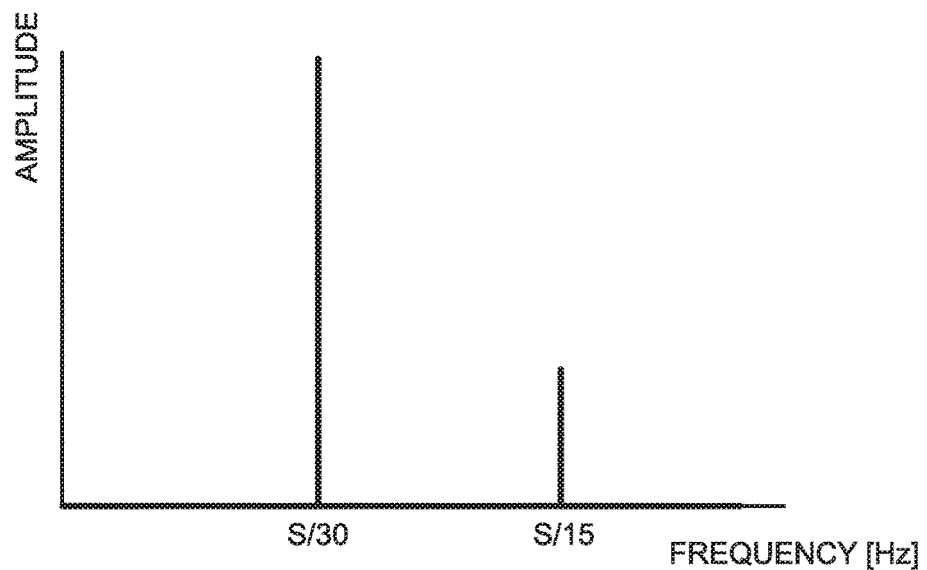
FIG. 4 is a graph illustrating a frequency analysis result obtained by the frequency analysis unit in a second embodiment.

FIG. 4 is a graph illustrating a frequency analysis result obtained by the frequency analysis unit 4 in the second embodiment. In the process diagnosis execution unit 5 according to the second embodiment, if a frequency of S/30 [Hz] or S/15 [Hz] falls within a range between $F_{min}$ [Hz] or more and $F_{max}$ [Hz] or less, which is the cutoff frequency band of the band elimination filter, then the process is diagnosed to be unperformable; and, if the frequency does not fall within the range, the process is diagnosed to be performable. Specifically, in the process diagnosis execution unit 5, if the revolution number of the rotation-cutting main shaft 11 falls within a range between $15F_{min}$ revolutions per minute or more and $15F_{max}$ revolutions per minute or less, or a range between $30F_{min}$ revolutions per minute or more and $30F_{max}$ revolutions per minute or less, then the process is diagnosed to be unperformable; and, if the revolution number of the rotation-cutting main shaft 11 does not fall within these ranges, the process is diagnosed to be performable. For example, in the case of $F_{min}$=29 [Hz] and $F_{max}$=31 [Hz], if the rotational speed S of the rotation-cutting main shaft 11 is 450 revolutions per minute or 900 revolutions per minute and further if the rotational speed S falls within a range between 435 revolutions per minute or more and 465 revolutions per minute or less or a range between 870 revolutions per minute or more and 930 revolutions per minute or less, then the process diagnosis execution unit 5 outputs a diagnosis result that the process is unperformable. The output diagnosis result is displayed by a display (not shown), for example. The display can be a display included in the vibration cutting process diagnostic device.

As described above, according to the second embodiment, the propriety of the vibration cutting process under a specified speed condition can be diagnosed in advance of the process being performed. Further, because a range of the machining speed that makes the process performable can be understood in advance of the process being performed, the machining speed can be determined without performing a trial process. Further, according to the second embodiment, when a command notch filter, which is an example of a control system having a band elimination filter characteristic is used, the propriety of the vibration cutting process can be diagnosed.

Third Embodiment

The configuration according to the third embodiment differs from that of the first embodiment in that machine anti-resonance is present in the shaft feeding system of the rectilinear shaft of the tool rest, which is a movable shaft. The position response characteristics of the rectilinear shaft include a characteristic in which the gain is lowered at an anti-resonance frequency. In the third embodiment, the sectional shape of a workpiece to be machined is the same as that of the workpiece according to the first embodiment; and the frequency component contained in a position command signal is assumed to be that illustrated by FIG. 3.

The movable shaft parameter 3 includes the anti-resonance frequency of a mechanical system; and this anti-resonance frequency is denoted by $F_a$ [Hz]. In the process diagnosis execution unit 5 according to the third embodiment, if a frequency of S/30 [Hz] is equal to $F_a$ [Hz], which is the anti-resonance frequency of the rectilinear shaft of the tool rest 14, the process is diagnosed to be unperformable; and, if the frequency is not equal to $F_a$ [Hz], the process is diagnosed to be performable. Specifically, if the revolution number of the rotation-cutting main shaft 11 is $30F_a$ revolutions per minute, the process is diagnosed to be unperformable; and, in the other cases, the process is diagnosed to be performable. For example, in the case of $F_a$=40 [Hz], if the rotational speed S of the rotation-cutting main shaft 11 is 1,000 revolutions per minute, the process is diagnosed to be performable. Further, in this case, the process diagnosis execution unit 5 outputs a diagnosis result that a value of the rotational speed S that makes the process unperformable is 1,200 revolutions per minute. The output diagnosis result is displayed by a display (not shown), for example. The display can be a display included in the vibration cutting process diagnostic device.

Note that, in the third embodiment, the anti-resonance frequency included in the movable shaft parameter 3 has been described as a single frequency $F_a$, but the present invention is not limited thereto. The anti-resonance frequency can be the upper limit frequency or the lower limit frequency of a frequency band with which the gain response of the mechanical system becomes not greater than a set gain value.

Figure 5:
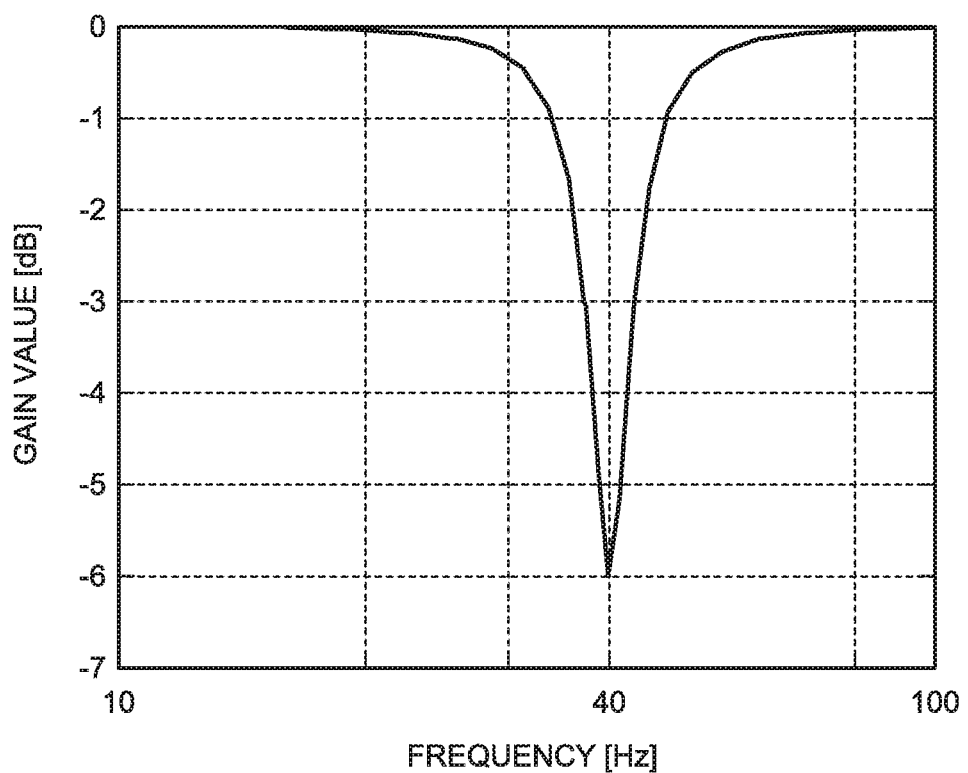
FIG. 5 is a view illustrating an example of the gain response characteristics of a mechanical system in the second embodiment.

FIG. 5 is a view illustrating an example of the gain response characteristics of the mechanical system with respect to the frequency. In a case where acceleration or inertance, which is the gain response from the drive force to acceleration of the mechanical system, has a characteristic as illustrated in FIG. 5, if an anti-resonance range is defined by a frequency band with a gain of –3 dB or less, then the upper limit frequency is 43 Hz and the lower limit frequency is 37 Hz. In this case, if the rotational speed S falls within a range between 1,110 revolutions per minute or more and 1,290 revolutions per minute or less, a diagnosis result is output indicating that the process is unperformable.

As described above, according to the third embodiment, the propriety of the vibration cutting process under a specified speed condition can be diagnosed in advance of the process being performed. Further, because the range of the machining speed that makes the process performable can be understood in advance of the process being actually performed, the machining speed can be determined without performing a trial process. Further, according to the third embodiment, when the mechanical system has anti-resonance characteristics, the propriety of the vibration cutting process can still be diagnosed.

The configurations illustrated in the above embodiments are merely examples of the contents of the present invention, and they may be combined with other known techniques. Further, the configurations can be partly omitted or changed without departing from the spirit of the present invention.

REFERENCE SIGNS LIST

1 shape data, 2 machining speed set value, 3 movable shaft parameter, 4 frequency analysis unit, 5 process diagnosis execution unit, 10 vibration cutting process diagnostic device, 11 rotation-cutting main shaft, workpiece, 13 tool rest drive unit, 14 tool rest, 15 rotation-cutting tool.

The invention claimed is:

1. A vibration cutting process diagnostic device that is capable of diagnosing, before machining, propriety of a vibration cutting process used when a movable shaft is reciprocated to machine a sectional shape of a working object into a non-complete round shape, the device comprising:
   a frequency analyzer to calculate a frequency component contained in a position command signal for the movable shaft on a basis of machining shape data on the working object and a machining speed set value; and
   a process diagnosis executor to diagnose propriety of machining the machining shape data under the machining speed set value on a basis of the frequency component, and a movable shaft parameter of the movable shaft, wherein
   the process diagnosis executor
      calculates a range of machining speeds that makes the process performable or a range of machining speeds that makes the process unperformable, and
      causes the display the range.

2. The vibration cutting process diagnostic device according to claim 1, wherein
   the movable shaft is driven by a control system having a characteristic of a low-pass filter;
   the movable shaft parameter includes a cutoff frequency of the low-pass filter; and
   if the frequency component is not less than the cutoff frequency, the process is diagnosed to be unperformable.

3. The vibration cutting process diagnostic device according to claim 1, wherein
   the movable shaft is driven by a control system having a characteristic of a band elimination filter;

the movable shaft parameter includes a cutoff frequency band of the band elimination filter; and if the frequency component falls within the cutoff frequency band, the process is diagnosed to be unperformable.

4. The vibration cutting process diagnostic device according to claim 1, wherein the movable shaft forms part of a mechanical system having an anti-resonance characteristic;

the movable shaft parameter includes the anti-resonance frequency of the mechanical system of the movable shaft; and if the frequency component is equal to the anti-resonance frequency, the process is diagnosed to be unperformable.

* * * * *